(12) United States Patent
Roberts et al.

(10) Patent No.: US 8,509,074 B1
(45) Date of Patent: Aug. 13, 2013

(54) SYSTEM, METHOD, AND COMPUTER PROGRAM PRODUCT FOR CONTROLLING THE RATE OF A NETWORK FLOW AND GROUPS OF NETWORK FLOWS

(75) Inventors: Lawrence G. Roberts, Woodside, CA (US); John A. Harper, Mountain View, CA (US)

(73) Assignee: Saisei Networks PTE Ltd, Singapore (SG)

( * ) Notice: Subject to any disclaimer, the term of this patent is extended or adjusted under 35 U.S.C. 154(b) by 269 days.

(21) Appl. No.: 12/415,717

(22) Filed: Mar. 31, 2009

Related U.S. Application Data

(60) Provisional application No. 61/041,117, filed on Mar. 31, 2008.

(51) Int. Cl.
*H04L 12/26* (2006.01)

(52) U.S. Cl.
USPC .......................................... 370/232; 709/233

(58) Field of Classification Search
USPC .. 370/232, 233, 235, 351, 392; 709/232–233
See application file for complete search history.

(56) References Cited

U.S. PATENT DOCUMENTS

| | | | | |
|---|---|---|---|---|
| 5,042,029 A | 8/1991 | Hayakawa | | 370/60 |
| 5,063,562 A | 11/1991 | Barzilai et al. | | 370/94.1 |
| 5,193,151 A | 3/1993 | Jain | | 395/200 |
| 5,949,757 A * | 9/1999 | Katoh et al. | | 370/232 |
| 6,092,115 A * | 7/2000 | Choudhury et al. | | 709/235 |
| 6,298,041 B1 | 10/2001 | Packer | | 370/231 |
| 7,180,857 B2 * | 2/2007 | Kawakami et al. | | 370/231 |
| 7,295,516 B1 * | 11/2007 | Ye | | 370/232 |
| 7,693,051 B2 * | 4/2010 | Ozer et al. | | 370/229 |
| 2002/0141379 A1 * | 10/2002 | Davari et al. | | 370/351 |
| 2002/0174279 A1 * | 11/2002 | Wynne et al. | | 710/113 |
| 2004/0158626 A1 * | 8/2004 | Douglas | | 709/224 |

OTHER PUBLICATIONS

Ramakrishnan et al., "The Addition of Explicit Congestion Notification (ECN) to IP," RFC 3168, Sep. 2001.
"Transmission Control Protocol," RFC 793, Information Sciences Institute, Marina del Rey, California, Sep. 1981.
"Flow-based Weighted Random Early Detection (WRED)," Cisco Systems, Inc., copyright 1992-2008 http://www.cisco.com/en/US/tech/tk543/tk760/tk230/tsd_technology_support_sub-protocol_home.html.

* cited by examiner

*Primary Examiner* — Habte Mered
(74) *Attorney, Agent, or Firm* — Zilka-Kotab, PC

(57) ABSTRACT

A system, method and computer program product are provided for controlling the rate of a network flow. In use, a rate of a network flow is monitored. In addition, it is determined whether the rate exceeds a threshold. Further, at least a portion of the network flow is conditionally discarded or marked, based on the determination.

20 Claims, 5 Drawing Sheets

SYSTEM, METHOD, AND COMPUTER PROGRAM PRODUCT FOR CONTROLLING THE RATE OF A NETWORK FLOW AND GROUPS OF NETWORK FLOWS

RELATED APPLICATION(S)

This application claims the benefit of U.S. Provisional Application No. 61/041,117 filed on Mar. 31, 2008, the disclosure of which is incorporated herein by reference.

BACKGROUND AND FIELD OF THE INVENTION

The present invention relates to routers and network appliances, and more particularly, to routing or management of flows of packets.

SUMMARY

A system, method and computer program product are provided for controlling the rate of a network flow and groups of network flows. In use, a composite rate of a group of network flows is measured and thresholds set for each network flow in the group. These thresholds are then used to control the rate of each of the network flows in the group. The rate of each network flow is measured and it is determined whether the rate exceeds its associated threshold. Further, at least a portion of the network flow is conditionally discarded or marked, based on the determination.

DETAILED DESCRIPTION

Figure 1:
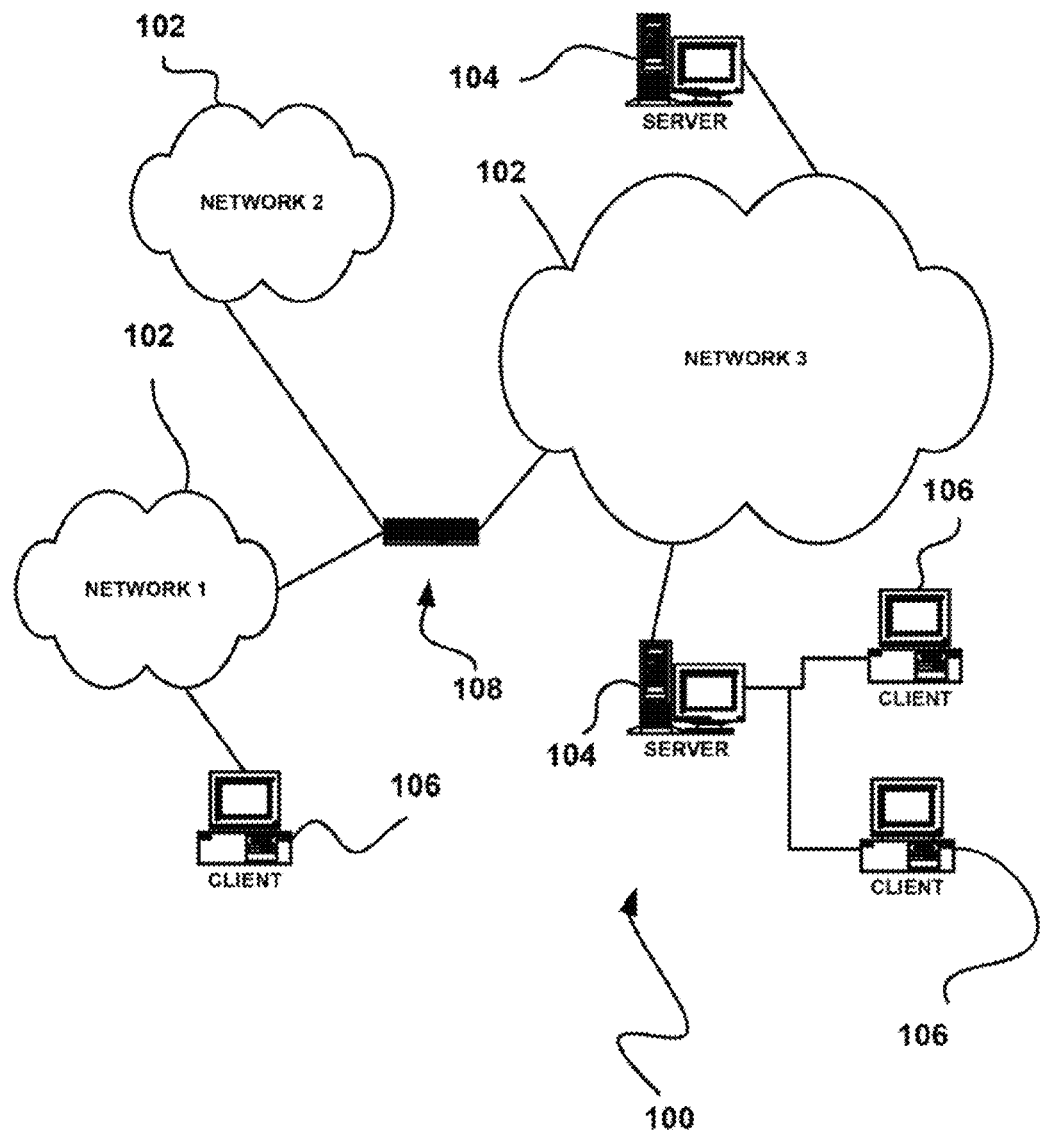
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, personal video recorder (PVR), a digital media [e.g. compact disc (CD), digital video disc (DVD), MP3, etc.] player, printer, and/or any other type of logic.

In order to facilitate communication among the networks 102, at least one network device 108 is coupled between the networks 102. In the context of the present description, such network device 108 may include any hardware and/or software capable of facilitating the communication of packets from one point in the network architecture 100 to another. For example, the network device 108 may include a router, a flow manager, and/or any other network device that meets the above definition, for that matter. More information regarding various features for enhancing such functionality will be set forth hereinafter in greater detail.

Figure 2:
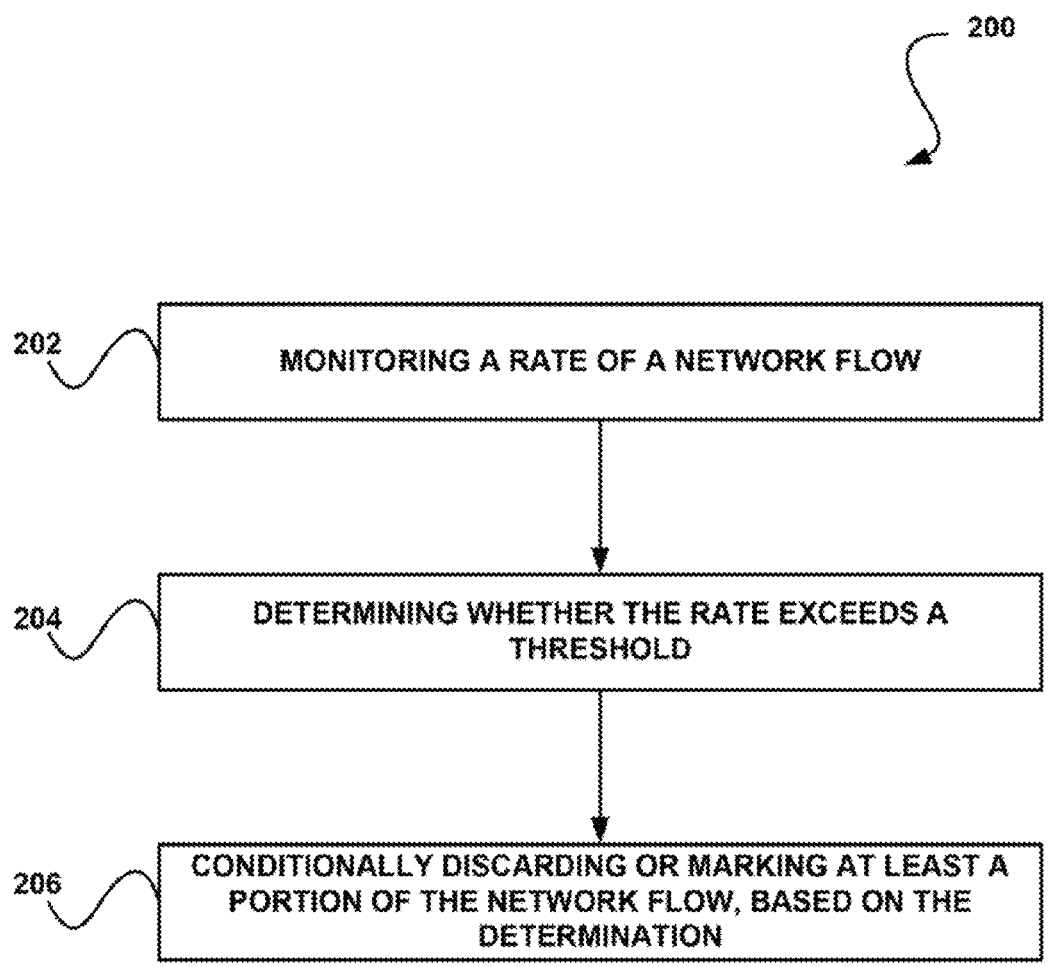
FIG. 2 shows a method for controlling the rate of a network flow, in accordance with one embodiment.

FIG. 2 shows a method 200 for controlling the rate of a network flow, in accordance with one embodiment. As an option, the present method 200 may be implemented in the context of the architecture and environment of FIG. 1. Of course, however, the method 200 may be carried out in any desired environment.

As shown in operation 202, a rate of a network flow is monitored. With respect to the present description, the network flow may include any flow of information utilized for communicating data over a network. Such network may include any of the networks described above with respect to FIG. 1, as an option.

In one embodiment, the network flow may include a plurality of packets. Of course, however, the network flow may include any type of data. In another embodiment, the network flow may utilize Transmission Control Protocol (TCP) for communicating the data over the network. TCP may be used for the majority of network traffic communicated over the network, for example.

Additionally, the network flow may communicate the data at any rate (e.g. speed, pace, etc.). As an option, the rate may be calculated by determining an amount of data (e.g. number of bytes, packets, etc.) communicated via the flow within a predefined period of time. In one embodiment, the network flow may be associated with an available rate (AR). The AR flow may include any flow for which a flow rate is determined by the network based on available capacity.

Further, the rate of the network flow may be monitored in any desired manner. As an option, the rate of the network flow may be monitored by a network device. The network device may include, as an option, that which is described above with respect to FIG. 1. Just by way of example, the rate of the network flow may be monitored by periodically calculating the rate of the network flow. In one embodiment, the rate may be calculated at predetermined time intervals. In another embodiment, the rate may be calculated in response to identification of at least a portion of the network flow. For example, the rate may be calculated in response to receipt of a packet of the network flow.

As also shown, it is determined whether the rate exceeds a threshold. Note operation 204. In one embodiment the determination may include comparing the rate to the threshold. Thus, it may be determined whether the rate exceeds the threshold, based on the comparison.

With respect to the present description, the threshold may include any predefined value indicating a threshold rate associated with the network flow. Such threshold may be indicated by a policy, for example. As another option, the threshold may be applicable to only a subset (e.g. a predefined subset, etc.) of network flows in which the network flow is included.

In one embodiment, the threshold may be variable. In this way, the threshold may optionally change over time. Just by way of example, the threshold may be automatically adjusted in response to predefined criteria. The predefined criteria may include available bandwidth, an amount of other traffic (e.g. network traffic other than the network flow), a physical rate of a port (e.g. of the network device) the network flow is destined for, etc.

Still yet, as shown in operation 206, at least a portion of the network flow is conditionally discarded or marked, based on the determination. In one embodiment, the portion of the network flow may be discarded if it is determined that the rate of the network flow exceeds the threshold. In another embodiment, at least a portion of the network flow, for example a packet, may be marked to indicate to a sender of the network flow that the rate of the network flow should be decreased or increased. Optionally, the network flow may be marked using a marking such as the Explicit Congestion Notification (ECN) code as specified in RFC 3168. In another embodiment, at least a portion of the network flow may be marked with a desired rate at which the sender is to send a subsequent portion of the network flow, for example as specified in a Telecommunication Industry Association standard (e.g. TIA 1039).

For example, with respect to TCP flows, all devices which send TCP (such as computers) may reduce the rate of a TCP flow to at least one half of the rate if any packet is discarded. One embodiment of in which the rate of a TCP flow may be reduced is described in IETF RFC 793 Transmission Control Protocol (http://www.faqs.org/rfcs/rfc793.html), which is incorporated herein by reference. Therefore, discarding or marking at least a portion of the network flow may reduce the rate of the network flow (e.g. by causing the sender of the network flow to reduce the rate of the network flow, for example, below the threshold).

If the discarding of the portion of the network flow is performed every time the rate of the network flow exceeds the threshold, the rate of the network flow may be controlled, such that the average rate of the network flow is a fraction (e.g. ¾, etc.) of the threshold. If the rate of the network flow is controlled from the time the network flow starts, the network flow may never be able to proceed to an average rate greater than a fraction (e.g. ¾) of the threshold, as an option. This may follow from normal TCP transmission following a sawtooth waveform, where the peak rate is a multiple (e.g. 4/3) of the average rate and the average rate increases slowly from near zero until a packet is discarded.

In one embodiment, only one packet of the network flow may be discarded when the rate exceeds the threshold. Further, the rate may be monitored until the rate decreases (e.g. in accordance with rules specified for TCP if a packet is noted missing). Decreasing the rate may take time since the missing packet may be noted by the TCP receiver and an acknowledgement sent back to the sender, noting the lost packet. The sender may then cut (e.g. reduce) the rate and start sending the network flow again. When this rate cut is noted at the monitoring point (e.g. the network device), the sender may start a new cycle. Accordingly, the determining if the rate exceeds the threshold may again be performed and if the rate again exceeds the threshold, another packet may be discarded. To this end, the average rate may be held at a fraction (e.g. ¾) of the threshold rate.

In another embodiment, it may be desirable to discard more than one packet of the network flow, which may cause the network flow to be reduced a greater amount (e.g. to'/the current rate). This may be desirable if the rate is so low that the start rate is higher than a fraction (e.g. ¾) of the threshold.

In another embodiment, it may be determined whether the flow rate rises above a predetermined amount, for example above a multiple (e.g. 4/3) of the threshold. This might occur if the sender of the network flow does not conform to TCP rules. In this case, a plurality of packets may be discarded to insure the rate is held to the average rate or a fraction (e.g. %) of the threshold.

To this end, the discarded portion of the network flow may include any portion capable of reducing the rate to be below the threshold, in one embodiment. The portion of the network flow may therefore optionally include that resulting in the rate exceeding the threshold. Just by way of example, the threshold may be a predefined number of bytes allowed to be communicated via the network flow over a particular time period. If the rate of the network flow exceeds the predefined number of bytes indicated by the threshold, one or more packets in the network flow for the particular time period may be discarded or marked so as to cause the sender to reduce the rate such that no more than the predefined number of bytes indicated by the threshold are sent during the next time period. For example, the discarding or marking may be periodically performed to control the rate of the network flow based on the threshold by signaling the sender of the network flow to decrease or increase the rate of the network flow.

In another embodiment, the portion of the network flow may include a predetermined portion. For example, the predetermined portion may include a predetermined number of packets (e.g. one packet, etc.). As another example, the monitoring and determining in operations 202 and 204 may be repeated after discarding the predetermined portion. Accordingly, the rate of the network flow may be reduced incrementally.

To this end, the amount of the network flow discarded may be limited to the minimum amount capable of reducing the rate of the network flow to be below the threshold. As an option, reducing the rate of the network flow in such a manner may allow precise control over the rate of the network flow, utilizing the threshold. Thus, network flow rates may be adjusted as desired. Adjusting the rate of network flows by discarding a portion of each the network flows may also prevent variances in the amount of time transactions are performed by such network flows. Furthermore, reducing the rate of the network flow by discarding the portion of the network flow may prevent other network elements, such as nearby routers, from queuing portions of the network flow to be output for reducing the rate, and thus eliminate any delay or delay jitter associated therewith.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
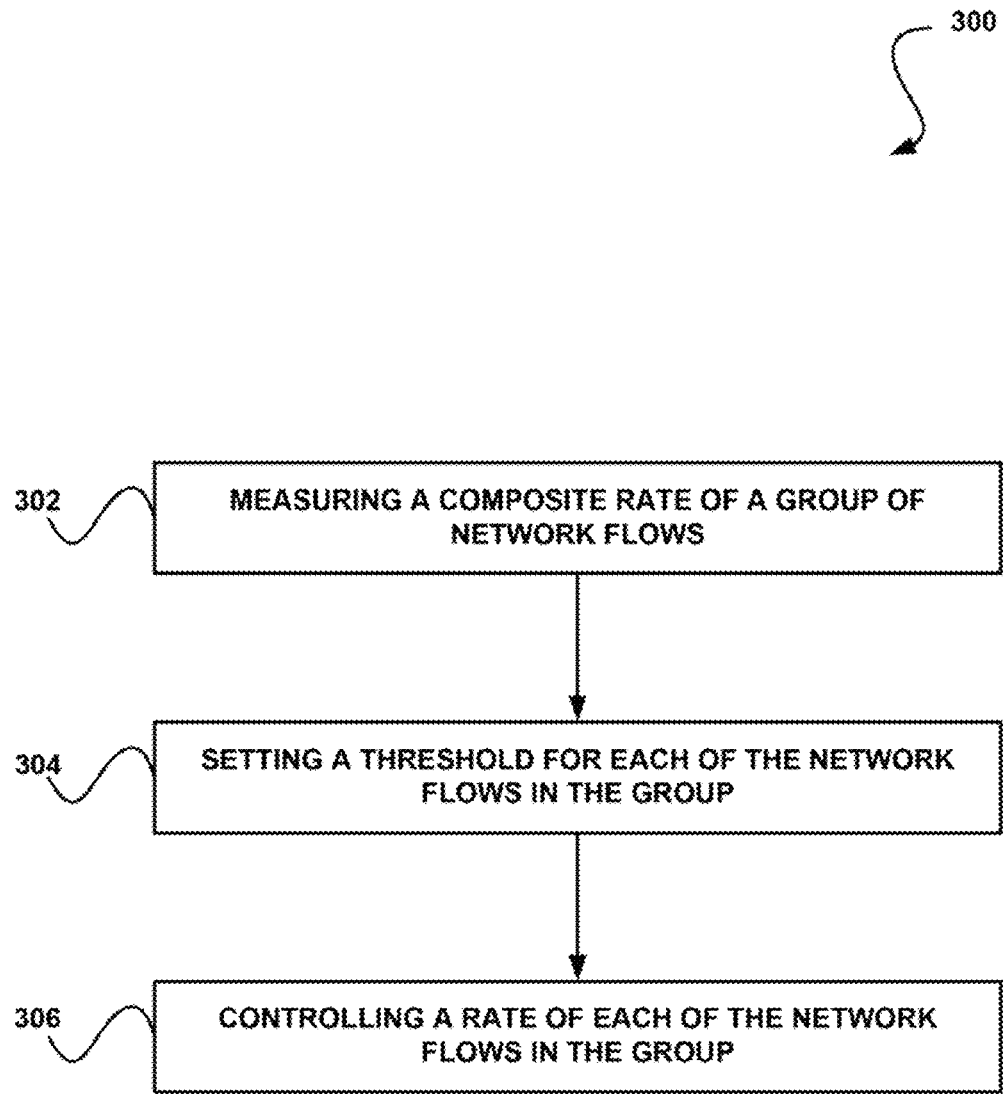
FIG. 3 shows a method for determining thresholds for controlling the rate of each network flow in a group, in accordance with another embodiment.

FIG. 3 shows a method 300 for determining thresholds for controlling the rate of each network flow in a group, in accordance with one embodiment. As an option, the present method 300 may be carried out in the context of the architecture and environment of FIGS. 1 and/or 2. Of course, however, the method 300 may be carried out in any desired environment. Further, the foregoing definitions may equally apply in the present description.

As shown in operation 302, a composite rate of a group of network flows is measured. In one embodiment, the group of network flows may include all the network flows destined to an output port on a network device (e.g. such as the network device 108 of FIG. 1). For example, the group of network flows may include all network flows destined for a single network address or subscriber In yet another embodiment, the group of network flows may include a subset of all the network flows exiting a network device (e.g. such as the network device 108 of FIG. 1).

There may optionally be many subsets of network flows exiting a network device, each subject to different requirements such as a maximum rate, a minimum rate, or a priority relative to other subsets. For example, the group of network flows may include all network flows forwarded out of the single output port. As another example, the group of network flows may include all network flows forwarded within a single virtual LAN (VLAN) within an output port. In another embodiment, the group of network flows may include all network flows originating from a single network address or subscriber.

In one embodiment, the composite rate may be, measured (e.g. monitored) by adding up all the bytes of data output for the group of network flows periodically at fixed intervals of time. In another embodiment, the composite rate may be measured by adding up all the bytes of data output for the group of network flows at random intervals and computing the rate by dividing the byte count by the time interval.

As shown in operation 304, a threshold is set for each of the network flows in the group of network flows. The thresholds may be computed subject to a set of goals and the measured composite rate of the group, as an option. The goals may be related to the desired maximum composite rate of the group, the minimum composite rate of the group, the priority of the network flows within the group, or other goals related to the composite rate of the group.

In one embodiment, the thresholds may be computed such that all network flows within the group have the same threshold and that the sum of those thresholds is a multiple of the desired composite rate of the group. For example the multiple may be 4/3. In another embodiment, the threshold for each of the network flows may be computed by dividing an available capacity equally among the network flows in the group. In another embodiment, the thresholds may be computed such that the sum of the individual priorities of each network flow adds up to a multiple of the desired composite rate. For example, the threshold for each of the network flows may be computed by dividing an available capacity proportional to a priority of each of the network flows in the group.

Further, as shown in operation 306, a rate of each of the network flows in the group is controlled. With respect to the present description, the rate of each of the network flows is controlled by monitoring a rate of the network flow (e.g. as described above with respect to operation 202 of FIG. 2), determining whether the rate exceeds the threshold (e.g. as described above with respect to operation 204 of FIG. 2), and conditionally discarding or marking at least a portion of the network flow, based on the determination (e.g. as described above with respect to operation 206 of FIG. 2).

In this way, the rate of each network flow may be precisely controlled to any desired rate. This, in turn, may optionally control the composite rate of the group of network flows. For example, as a result of adjusting the rate of a network flow in the group, the composite rate of the group may be proportionally adjusted.

Figure 4:
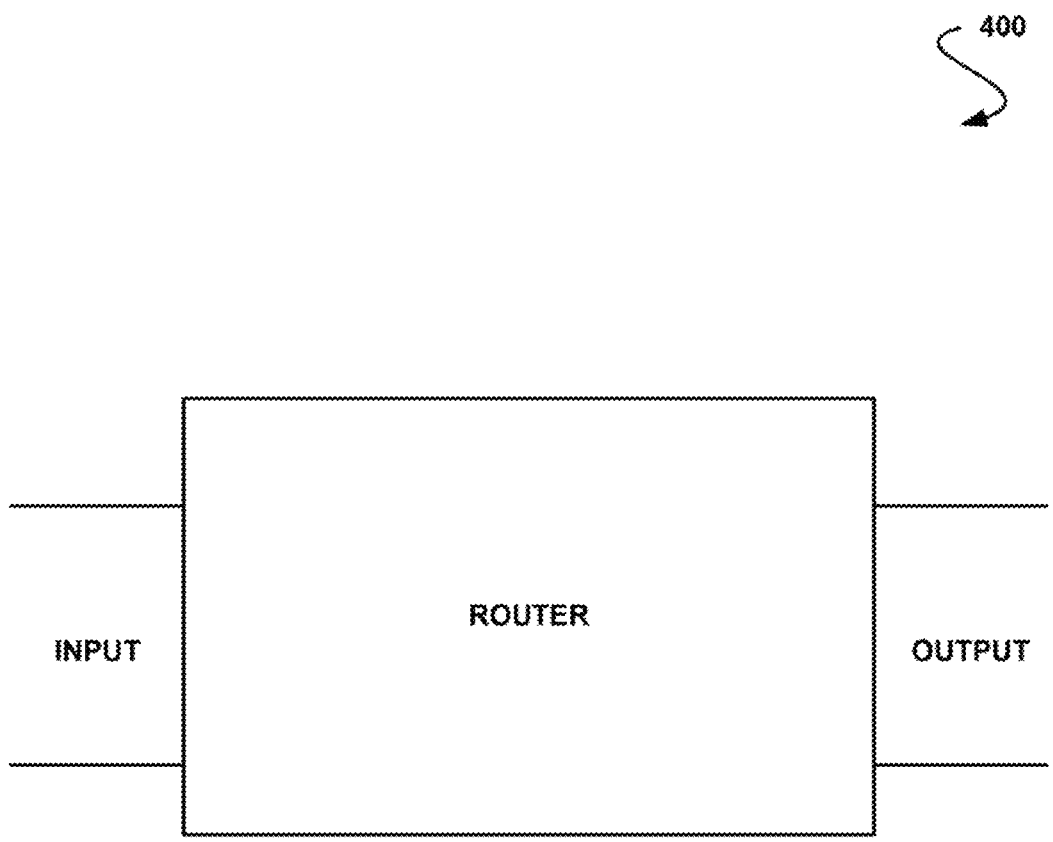
FIG. 4 shows a router for controlling the rate of a network flow and groups of network flows, in accordance with another embodiment.

FIG. 4 shows a router 400 for monitoring a rate of a network flow and groups of network flows, in accordance with another embodiment. As an option, the router 400 may be implemented in the context of the architecture and environment of FIGS. 1-3. Of course, however, the router 400 may be implemented in any desired environment. Further, the foregoing definitions may equally apply in the present description. Finally, while a router is shown in FIG. 4, it should be noted that any network device may be employed in the context of the present embodiment (e.g. a flow manager, etc.).

As shown, the router 400 receives input and transmits output. The router 400 may include the router described above with respect to FIG. 1, for example. As another example, the router 400 may be utilized for transmitting data over a network via network flows. As an option, the router 400 may transmit network flows from a first network to a second different network.

Thus, in one embodiment, the input received by the router 400 may include a network flow. In another embodiment, the output transmitted by the router 400 may include the network flow. Additionally, the router 400 may monitor and control the rate of the received network flow prior to outputting the network flow, as described below.

In response to receipt of a first portion of the network flow, the router 400 may initiate monitoring of a rate of the network flow. In one embodiment, the router 400 may monitor the rate of the network flow by calculating the rate of the network flow periodically. In another embodiment, the router 400 may store results of the monitoring of the network flow, such as each calculated rate of the network flow.

For example, the router 400 may identify each receipt of a plurality of portions of the network flow (e.g. each receipt of a packet, etc.). Additionally, the router 400 may calculate a rate of the network flow in response to each receipt of one of the plurality of portions of the network flow. The rate may optionally be calculated based on the latest received portion of the network flow and any previously received portions of the network flow. In this way, monitoring the rate of the network flow may include periodically determining an updated rate of the network flow, in one embodiment.

Furthermore, in response to the calculation of a rate of the network flow, the router 400 may determine whether the rate exceeds a threshold. Such threshold may include a predetermined rate allowed to be output by the router 400, for example. In one embodiment, the threshold may be generated manually (e.g. by a user, etc.). In another embodiment, the threshold may be generated automatically (e.g. based on available network bandwidth, etc.).

If it is determined that the rate does not exceed the threshold, the network flow may be output by the router 400 (e.g. without necessarily modifying the network flow). As an option, the router 400 may output a latest received portion of the network flow. In this way, the router 400 may determine for each portion of a network flow received whether the network flow exceeds the threshold, such that the portion of the network flow may be output by the router 400 if it is determined that such portion will not result in an average rate exceeding a fraction (e.g. ¾) of the threshold.

If it is determined that the rate exceeds the threshold, the latest received portion of the network flow may be discarded. For example, the router 400 may discard or mark a portion of the network flow. Moreover, the router 400 may continue monitoring the rate of the network flow after the latest received portion of the network flow is discarded or marked. In this way, conditionally discarding or marking portions of the network flow based on the rate of the network flow may ensure that average rate of transmission of the network flow by the router 400 does not exceed a fraction (e.g. ¾) of the threshold.

Figure 5:
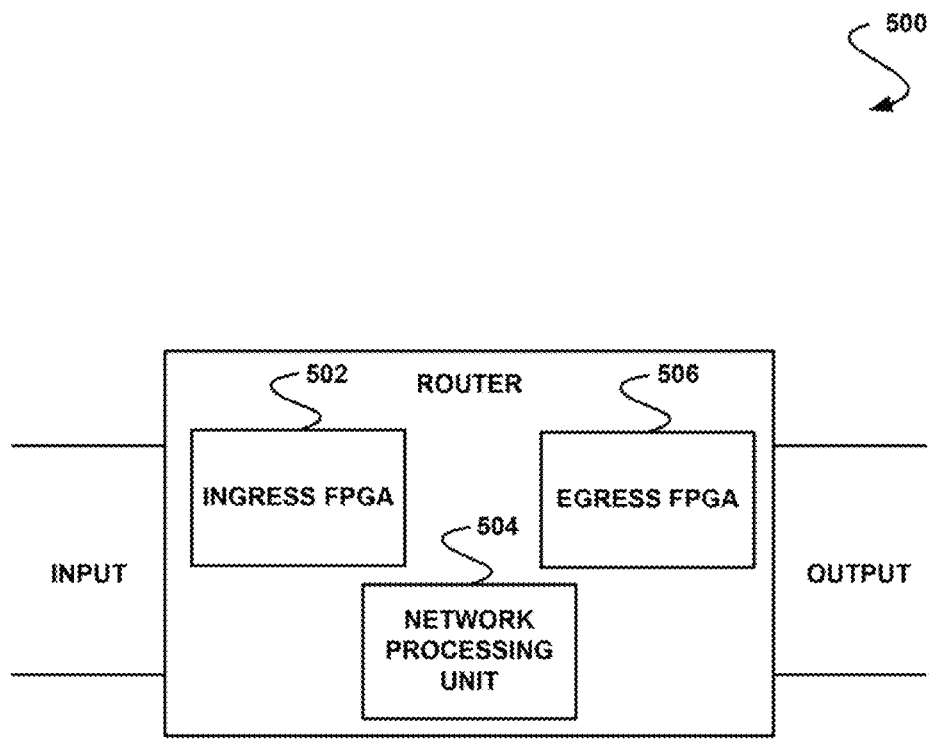
FIG. 5 shows a router for controlling the rate of a network flow and groups of network flows, in accordance with yet another embodiment.

FIG. 5 shows a router 500 for monitoring a rate of a network flow and groups of network flows, in accordance with yet another embodiment. As an option, the router 500 may be implemented in the context of the architecture and environment of FIGS. 1-4. Of course, however, the router 500 may be implemented in any desired environment. Again, the foregoing definitions may equally apply in the present description.

As shown, the router 500 receives input and transmits output. The router 500 may include the router described above with respect to FIG. 1, for example. As another example, the router 500 may be utilized for transmitting data over a network via network flows. As an option, the router 500 may transmit network flows from a first network to a second different network. Again, while a router is shown in FIG. 5, it should be noted that any network device may be employed in the context of the present embodiment (e.g. a flow manager, etc.).

Thus, in one embodiment, the input received by the router 500 may include a network flow. In another embodiment, the output transmitted by the router 500 may include the network flow. Additionally, the router 500 may monitor the received network flow prior to outputting the network flow, as described below.

As also shown, the router 500 includes an ingress field programmable gate array (FPGA) 502. In one embodiment, the ingress FPGA 502 may include an input port of the router 500. The ingress FPGA 502 receives the network flow input to the router 500. Additionally, the ingress FPGA 502 monitors a rate of the network flow.

In one embodiment, the ingress FPGA 502 may monitor the rate of the network flow by periodically calculating the rate of the network flow. For example, in response to receipt of a portion of the network flow by the ingress FPGA 502, the ingress FPGA 502 may calculate the rate of the network flow. As an option, the ingress FPGA 502 may calculate the rate of the network flow based on the latest received portion and any previously received portions. Accordingly, the calculated rate may reflect a rate at which the network flow is received by the router 500.

In another embodiment, the ingress FPGA 502 may store the calculated rate of the network flow. For example, the calculated rate may be stored in an ingress flow record. The stored rate may optionally be updated with the latest calculated rate after each calculation of the rate of the network flow. Of course, it should be noted that any other information associated with the network flow may also be stored in the ingress flow record.

Furthermore, in response to calculation of the rate of the network flow, the ingress FPGA 502 may determine whether the calculated rate exceeds a threshold. In one embodiment, the ingress FPGA 502 may identify the threshold in response to receipt of a new network flow by the ingress FPGA 502. Just by way of example, the ingress FPGA 502 may receive an indication of the threshold from the network processing unit (NPU) 504 (e.g. in response to a request for the threshold sent from the ingress FPGA 502 to the NPU 504, etc.).

As an option, the NPU 504 may store the threshold in response to receipt of a message from an egress FPGA 506 of the router 500. In one embodiment, the egress FPGA 506 may include an output port of the router 500. Further, the message may indicate the threshold. The egress FPGA 506 may periodically send the message indicating the threshold to the NPU 504, as an option.

For example, the egress FPGA 506 may be utilized for determining the threshold. In one embodiment, the egress FPGA 506 may determine the threshold based on predetermined criteria. In various embodiments, the predetermined criteria may include an available bandwidth of the network to which the network flow is requested to be output, the rates of other network flows exiting the same output port, an available capacity of a port of the router 500 capable of being utilized for transmitting the network flow over the network, etc. Such predetermined criteria may be calculated by the egress FPGA 506, as an option.

In another embodiment, the egress FPGA 506 may determine the threshold based on information associated with output of a group of network flows. The egress FPGA 506 may optionally measure the number of bytes output by a group of network flows. Just by way of example, the information may be utilized by the egress FPGA 506 for determining the thresholds of each network flow, utilizing the measured output rate, the number of network flows, and optionally, the priority of each network flow.

To this end, the ingress FPGA 502 may utilize the threshold received from the NPU for determining whether the rate of the network flow exceeds such threshold. If the ingress FPGA 502 determines that the rate of the network flow does not exceed the threshold, the ingress FPGA 502 may transmit the latest received portion of the network flow to the egress FPGA 506. Also, if the ingress FPGA 502 determines that prior discards or markings of the packets in the network flow will cause the sender to reduce the average rate of the network flow to subsequently not exceed the threshold, the ingress FPGA 502 may transmit the latest received portion of the network flow. Moreover, the egress FPGA 506 may output such latest portion of the network flow. By way of example, for network flows such as TCP, where the sender of the network flow cuts the sending rate in half in response to even one discarded packet, the ingress FPGA 502 may optionally only discard one packet each time period to accurately control the rate of a network flow. This may permit the network flow rates to be controlled with very low packet losses. Marking instead of discarding, when supported, may allow the packet loss to be eliminated.

if, however, the ingress FPGA 502 determines that the rate of the network flow exceeds the threshold and that no portion of this network flow has recently been discarded or marked to correct the flow rate, the ingress FPGA 502 may discard or mark the latest portion of the network flow. Discarding or marking the latest portion of the network flow in this manner may reduce the rate of the network flow by signaling to the sender of the flow to reduce the rate of the network flow being sent to the router 500. Accordingly, a rate of the network flow may be reduced by discarding any portion of the network flow for which the communication thereof would result in an average rate exceeding a fraction (e.g. ¾) of the threshold.

It should be noted that while the ingress FPGA 502 and the egress FPGA 506 are shown as separate modules, the ingress FPGA 502 and the egress FPGA 506 may be integrated on a single interface module, in another optional embodiment. However, as noted above, the ingress FPGA 502 may be utilized for ensuring the average rate at which the network flow is output by the router 500 is held (approximately) at the rate indicated by the threshold (e.g. the rate which the threshold was computed to produce). Utilizing the ingress FPGA 502 may thus allow the rate of each flow to be independently controlled (based on the threshold). Further, the output of each network flow by the router 500 may be smooth (e.g. by maintaining predefined levels of quality of assurance) as a result of limits ensured by use of the threshold.

Controlling the rate of the network flow may optionally avoid various limitations associated with accumulation and queuing of all network flows which are to output at a port. Since the discarding or marking may be made to each network flow based on a rate of the network flow, random rate reduction of some flows with no impact on other flows may be prevented; thus further preventing unequal rate reductions of network flows and compromised performance. In addition, optionally avoiding use of output queues may maintain quality of network flows associated with voice and video. Further, slow web transactions may be avoided (e.g. due to the uneven rates of the network flows utilized to deliver parts of the web page). For example, since a requestor of the web page may be prevented from viewing the web page until a last piece of the web page is received, it may be ensured that all the parts of the web page are communicated at similar rates, and are not randomly distributed [e.g. as may otherwise happen with the random discards associated with output queue rate management such as WRED (Flow-based Weighted Random Early Detection (WRED)].

In one optional embodiment, controlling the rate of each network flow may allow the total traffic arriving at a router or flow manager output port to be maintained at a highest possible utilization level without requiring the delay of an output queue and the random discards which result from queue overload. When there are a plurality (e.g. hundreds to thousands) of network flows exiting an output port, controlling the rate of each network flow as described herein (e.g. using output measurement, rate feedback, and selective discarding or marking of each network flow) may optionally result in a statistically effective alternative to random discards at output queues. Just by way of example, with a large number of equal priority flows, even if each flow is allowed to exceed the average rate for the time it takes for the sender to adjust the rate, the statistical average total output rate can be held to a high utilization without risk of the total rate exceeding the port capacity. Thus, controlling the rate of each network flow may provide low delay, high quality traffic management (e.g. as an alternative to output queues and the associated random discards).

The thresholds of individual network flows may be set in any desired manner, such as based on the measured composite output rates of various groups of network flows, the priority assigned to individual network flows, and/or the desired goals for the relative rates of the output groups. For example, if it is desired that available network capacity be equally shared between all the subscribers sharing a single network node, the groups of network flows measured may be set to be subscribers, the node capacity divided equally between subscribers, and the thresholds for all the individual network flows for a subscriber computed to share the subscriber's portion of the capacity. This may optionally prevent a problem caused by applications which use many network flows when capacity is shared (as may be normal) equally per network flow, particularly where these applications and the subscribers which utilize them unfairly consume most of the network capacity paid for by their neighbors.

Moreover, in one exemplary embodiment, managing the rates of individual network flows may provide congestion avoidance. For example, when too much demand is placed on a network trunk (which may be the result when using the normal output queue and WRED discard technique for congestion control) voice and video network flows may suffer from delay jitter, and discarded packets and TCP data network flows may suffer stalls and flow termination from multiple packets being discarded too close together, whereas when controlling each network flow individually based on thresholds set by feedback from measuring the output utilization, the video and voice network flows which have self limited rates may optionally suffer no delay jitter or packet discard. Further, TCP data flows may be rate controlled such that there is no overall congestion and thus no multiple packet discards causing network flow stalls or failures.

In addition to quality of service stemming from controlling the composite rate of traffic exiting a network device based on controlling the rate each network flow, new services may optionally be offered, such as priority for time critical and higher value traffic, guaranteed capacity for individual subscribers, and limits on capacity for other subscribers, all without causing congestion collapse.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method to control the rate of an individual network flow, comprising:
   for every individual transmission control protocol (TCP) network flow, monitoring and saving a rate of each individual TCP network flow;
   determining whether the rate exceeds an individual threshold, the threshold configured based on an available capacity of each of an output port and a group of network flows; and
   conditionally providing feedback for the individual TCP network flow to indicate to a device sending the individual TCP network flow which is executing TCP rules to cause the device to decrease the rate of the individual TCP network flow, based on the determination.

2. The method of claim 1, wherein the rate of the individual TCP network flow is monitored by periodically calculating the rate of the individual TCP network flow.

3. The method of claim 2, wherein the rate of the individual TCP network flow is calculated by determining an amount of data communicated via the individual TCP network flow within a predefined period of time.

4. The method of claim 2, wherein the rate of the individual TCP network flow is calculated at predetermined time intervals.

5. The method of claim 2, wherein the rate of the individual TCP network flow is calculated in response to identification of the at least a portion of the individual TCP network flow.

6. The method of claim 5, wherein the rate of the individual TCP network flow is calculated in response to receipt of a packet of the individual TCP network flow.

7. The method of claim 1, wherein the threshold is variable.

8. The method of claim 7, wherein the threshold is automatically adjusted in response to predefined criteria.

9. The method of claim 8, wherein the predefined criteria includes available bandwidth.

10. The method of claim 8, wherein the predefined criteria includes a physical rate of a port to which the individual TCP network flow is destined.

11. The method of claim 1, wherein the feedback is provided in association with at least a portion of the individual TCP network flow, which includes a single packet of the individual TCP network flow.

12. A method to control the total rate of a group of network flows comprising:
   measuring a composite rate of a group of individual TCP network flows;
   setting a threshold for each of the individual TCP network flows in the group; and
   for every one of the individual TCP network flows in the group, controlling a rate of the individual TCP network flow, comprising:
   monitoring and saving a rate of each individual TCP network flow;
   determining whether the rate exceeds an individual threshold, the threshold configured based on an available capacity of each of an output port and the group of individual TCP network flows; and
   conditionally providing feedback for the individual TCP network flow to indicate to a device sending the individual TCP network flow which is executing TCP rules to cause the device to decrease the rate of the individual TCP network flow, based on the determination.

13. The method of claim 12, further comprising computing the threshold for each of the individual TCP network flows by dividing the available capacity equally among the individual TCP network flows in the group.

14. The method of claim 12, further comprising computing the threshold for each of the individual TCP network flows by dividing the available capacity proportional to a priority of each of the individual TCP network flows in the group.

15. The method of claim 12, where the group includes all individual TCP network flows forwarded out of the output port.

16. The method of claim 12, where the group includes all individual TCP network flows forwarded within a single VLAN within the output port.

17. The method of claim 12, where the group includes all individual TCP network flows originating from a single network address or subscriber.

18. The method of claim 12, where the group includes all individual TCP network flows destined for a single network address or subscriber.

19. A computer program product embodied on a non-transitory computer readable medium, comprising:
   computer code for measuring and saving a rate of every individual TCP network flow;
   computer code for setting a threshold for each of the individual TCP network flows; and
   for every one of the individual TCP network flows in a group, computer code for controlling a rate of the individual TCP network flow in the group, comprising:
      computer code for monitoring and saving a rate of each individual TCP network flow;
      computer code for determining whether the rate exceeds an individual threshold, the threshold configured based on an available capacity of each of an output port and the group of individual TCP network flows; and
      conditionally providing feedback for the individual TCP network flow to indicate to a device sending the individual TCP network flow which is executing TCP rules to cause the de ice to decrease the rate of the individual TCP network flow, based on the determination.

20. An apparatus, comprising:
   a router for measuring a composite rate of every individual TCP network flow, setting an individual threshold for each of the individual TCP network flows, and for every one of the individual TCP network flows, controlling a rate of the individual TCP network flow by monitoring and saving a rate of the individual TCP network flow, determining whether the rate exceeds an individual threshold, the threshold configured based on an available capacity of each of an output port and a group of individual TCP network flows, and conditionally providing feedback for the individual TCP network flow to indicate to a device sending the individual TCP network flow which is executing TCP rules to cause the device to decrease the rate of the individual TCP network flow, based on the determination.

* * * * *